(12) United States Patent
Weiss et al.

(10) Patent No.: US 10,904,020 B2
(45) Date of Patent: Jan. 26, 2021

(54) USER FOR A DIGITAL COMMUNICATION SYSTEM AND CORRESPONDING COMMUNICATION SYSTEM

(71) Applicant: Robert Bosch GmbH, Stuttgart (DE)

(72) Inventors: Timo Weiss, Hemmingen (DE); Andreas Haenle, Rangendingen (DE); Jochen Schueler, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 16/327,524

(22) PCT Filed: Jul. 3, 2017

(86) PCT No.: PCT/EP2017/066458
§ 371 (c)(1),
(2) Date: Feb. 22, 2019

(87) PCT Pub. No.: WO2018/036694
PCT Pub. Date: Mar. 1, 2018

(65) Prior Publication Data
US 2019/0222429 A1    Jul. 18, 2019

(30) Foreign Application Priority Data

Aug. 26, 2016 (DE) .......................... 10 2016 216 066

(51) Int. Cl.
*H04L 12/12* (2006.01)
*F25B 21/02* (2006.01)
(Continued)

(52) U.S. Cl.
CPC .............. *H04L 12/12* (2013.01); *F25B 21/02* (2013.01); *H04B 3/44* (2013.01);
(Continued)

(58) Field of Classification Search
CPC .. H04L 12/12; F25B 21/02; F25B 2321/0212; H04B 3/44; H04W 52/0229; Y02D 30/50; Y02D 30/70
See application file for complete search history.

(56) References Cited

U.S. PATENT DOCUMENTS

2003/0231049 A1    12/2003  Sommer et al.
2004/0145500 A1 *   7/2004  Huebl ............... H04L 12/40039
                                                      340/994
(Continued)

FOREIGN PATENT DOCUMENTS

DE    102010049835 A1    5/2012
DE    102014208257 A1    11/2015
(Continued)

OTHER PUBLICATIONS

International Search Report dated Sep. 26, 2017 of the corresponding International Application PCT/EP2017/066458 filed Jul. 3, 2017.

*Primary Examiner* — Xuxing Chen
(74) *Attorney, Agent, or Firm* — Norton Rose Fulbright US LLP; Gerard Messina (57) ABSTRACT

A digital communication system user, via which a first logic signal and a second logic signal are transmitted, includes an activation circuit that includes encompassing a supply unit, a switching unit, a transmission unit, and a communication interface. The supply unit provides an internal supply voltage, the switching unit couples the supply unit to the transmission unit to supply the transmission unit with the internal supply voltage, and the transmission unit outputs a wake-up signal, which includes the first logic signal, to the communication interface in response to being supplied with the internal supply voltage by the supply unit, and subsequently continuously outputs the second logic signal to the
(Continued)

communication interface until the switching unit separates the transmission unit from the supply unit by.

17 Claims, 4 Drawing Sheets

(51) Int. Cl.
*H04B 3/44* (2006.01)
*H04W 52/02* (2009.01)

(52) U.S. Cl.
CPC . *H04W 52/0229* (2013.01); *F25B 2321/0212* (2013.01); *Y02D 30/50* (2020.08)

(56) References Cited

U.S. PATENT DOCUMENTS

| | | | |
|---|---|---|---|
| 2012/0051241 A1* | 3/2012 | Mori | H04L 12/12 370/252 |
| 2012/0066531 A1* | 3/2012 | Shafai | H04W 52/0229 713/323 |
| 2014/0354404 A1* | 12/2014 | Lin | G07C 9/00182 340/5.64 |
| 2017/0245319 A1* | 8/2017 | Yasukawa | H04W 52/028 |

FOREIGN PATENT DOCUMENTS

| | | |
|---|---|---|
| EP | 2230135 A2 | 9/2010 |
| JP | 2004249772 A | 9/2004 |
| JP | 2012054701 A | 3/2012 |
| JP | 2013243758 A | 12/2013 |

\* cited by examiner

USER FOR A DIGITAL COMMUNICATION SYSTEM AND CORRESPONDING COMMUNICATION SYSTEM

CROSS-REFERENCE TO RELATED APPLICATIONS

The present application is the national stage of International Pat. App. No. PCT/EP2017/066458 filed Jul. 3, 2017, and claims priority under 35 U.S.C. § 119 to DE 10 2016 216 066.4, filed in the Federal Republic of Germany on Aug. 26, 2016, the content of each of which are incorporated herein by reference in their entireties.

FIELD OF THE INVENTION

The present invention relates to one or more users of a digital communication system and to a corresponding communication system.

BACKGROUND

Modern communication systems such as, for example, CAN bus-based systems, have a main energy source that feeds all consumers and therefore all bus users. To prevent the energy consumption of the communication system in the switched-off state from becoming too great, virtually all consumers in this state are completely switched off or switched into a standby mode.

Only a few dedicated power-saving consumers remain active. These consumers wait for external signals in order to awaken the communication system through communication via the respective communication line. In the process, the users are shifted from a sleep mode into a normal mode and, if necessary, a power supply for additional users is switched on.

The communication system is activated externally, for example, with a wireless connection or directly mechanically by actuating a switch. The dedicated, power-saving consumers utilize a connection either to an external energy source or to an internal energy source. Such consumers, if they have an internal energy source, must be charged and renewed from time to time.

A problem with such communication systems is that such dedicated power-saving consumers, which are suitable for awakening the communication system from the sleep mode, are severely limited, since these communication systems continuously consume energy from the main energy source.

SUMMARY

The user according to the present invention in a digital communication system, via which a first logic signal and a second logic signal are transmitted, includes an activation circuit that includes a supply unit, a switching unit, a transmission unit and a communication interface, the supply unit being configured to provide an internal supply voltage, the switching unit being configured to couple the supply unit to the transmission unit in order to supply the transmission unit with the internal supply voltage, and the transmission unit being configured to output a wake-up signal to the communication interface in response to being supplied with the internal supply voltage by the supply unit, which wake-up signal includes at least the first logic signal, and to continuously output the second logic signal to the communication interface following the output of the wake-up signal until the transmission unit is separated from the supply unit by the switching unit.

In other words, the activation switch of the user is suitable for emitting the wake-up signal of an arbitrary receiver in the communication system, in particular, to output the wake-up signal on a communication line. Once the wake-up signal has been emitted, no further action by the user takes place. The wake-up signal is emitted once again only when the transmission unit has been separated from the supply unit by the switching unit and coupled to the supply unit again. In an example, the activation unit is not suitable for receiving and for processing communication signals. The user is configured to couple the supply unit to the transmission unit in response to an activation signal, in order to then output the wake-up signal. Subsequently, no communication of any kind by the user takes place in the digital communication system until the supply unit is coupled again to the transmission unit. The wake-up signal is a signal pattern. This signal pattern can be adapted to a particular receiver in order to awaken this particular receiver in the communication system, i.e., to shift the receiver into an active state.

The digital communication system is preferably a hardwired communication system, preferably a communication bus, for example, a CAN bus, or a FlexRay bus. Other exemplary communication systems are a LAN network, in particular, an Ethernet network, a LIN network, a MOST bus or a sensor network or sensor bus, for example a PSI5 bus. The digital communication system is preferably hardwired, since a large amount of energy is required in such communication systems due to the low termination impedance. The digital communication system is preferably also a local area network (LAN). The communication interface is an interface, for example, a driver, to a transmission medium of the communication system, for example, to a transmission line, in particular, to a communication bus. The wake-up signal is a signal, which is suitable for activating additional users of the communication system. Such a wake-up signal is typically defined in a standard that defines the communication system. The first logic signal is, for example, a high signal, and the second logic signal is, for example, a low signal. The second logic signal corresponds, for example, to a signal that is output by an arbitrary user of the digital communication system, when this user is not supplied with an operating voltage. The first logic signal and the second logic signal thus represent the two signal levels in a digital communication via the communication system.

The user according to example embodiment of the present invention is distinguished by the fact that this user has only a very low power consumption, which means that this user is very compact and can be very cost-efficiently manufactured. The user is therefore able to awaken a bus system in a very energy-saving and simple manner. The low wave impedance of a communication line, which is typically between 60 and 120 Ohms in the case of a small bus, for example, is a problem in many communication networks. This impedance makes a small energy store virtually impossible, since a user of the communication system must therefore be constantly driven using minimal energy. The present invention is based on a wake-up function of communication systems, which can be triggered by a few voltage pulses and is able solely thereby to awaken and switch on the entire system.

The user preferably encompasses a communication unit, which is configured to be coupled to the communication system and is configured to transmit and to receive the first logic signal and the second logic signal in the communication system. Thus, in addition to the activation circuit, the user includes a communication unit, the communication unit being configured to transmit and to receive data in the digital communication system. This takes place via the corresponding communication medium of the communication system. In this way, a user is created, which can participate to the full extent in a communication in the communication system.

It is advantageous if the communication unit includes a supply input and is configured to be supplied via the supply input with a central supply voltage. In this way, the communication unit of the user, which is distinguished by a higher energy requirement than the activation circuit, can be supplied by an external supply voltage, which is always available, for example, when the communication system is not in the sleep mode, for example, once the communication system has been awakened by the activation circuit. The user can therefore have a particularly compact design, since no internal energy store for the communication unit is needed.

It is further advantageous if the transmission unit encompasses at least one comparator and one capacitor interconnected with a timer in order to generate the first logic signal in the wake-up signal in accordance with a predefined period of time. Thus, the wake-up signal can be generated in a particularly simple manner without the need for a memory or a processor. Such a transmission unit, and thus also the user, is particularly energy-efficient.

The supply unit preferably includes a Peltier element and/or a solar cell. This ensures that the user is able to awaken the communication system, even after long inactivity.

The supply unit further includes an energy buffer, which is charged, for example, by a local energy store, for example, a button cell, a Peltier element, and/or a solar cell. This therefore enables the energy buffer, for example, a capacitor, to be charged over a longer period of time, in order to then provide a sufficient internal supply voltage for the activation circuit. This enables the possibility of the necessary solar cell or the necessary Peltier element being particularly compactly designed or being very flexibly mounted. The energy buffer preferably includes a multilayer ceramic chip capacitor (MLCC), which is distinguished by its compact design and at the same time prevents an excessively rapid discharge of an energy source of the supply unit. An energy store is a local energy store if the energy store is integrated into the user, i.e., for example, is installed, together with the supply unit, in a shared housing.

It is also advantageous if the transmission unit is configured to output either a first signal pattern or a second signal pattern as a wake-up signal to the communication interface. A selection of whether the first signal pattern or the second signal pattern is output as a wake-up signal is made preferably based on a user input or with the aid of a selection by a control signal. This allows different users in the communication system to be awakened systematically based on the choice. Alternatively, the transmission unit is configured to output an arbitrary number of different signal patterns in sequence or based on a selection.

A communication system including the user, a communication line, and a first additional user is likewise advantageous. The first additional user is configured, in particular, to transmit and to receive data in the digital communication system. Such a communication system includes the advantages of the user.

The user and the first additional user are preferably connected via the communication line and the first additional user is configured to switch from an inactive mode into an active mode when the first additional user receives the wake-up signal via the communication line. The first additional user is therefore a user that can be shifted by the wake-up signal from a standby mode into a normal mode. The first additional user in such a communication system can be particularly easily shifted by the user into the normal mode. Thus, it is possible, in particular, to design the first additional user in such a way that the first additional user is unable to emit the wake-up signal, as a result of which this first additional user and, thus, the communication system, can be particularly cost-efficiently designed.

The communication system preferably includes a central voltage source configured to provide a central supply voltage, the first additional user being coupled to the central voltage source in order to be supplied by the central voltage source with the central supply voltage in the active mode and in the inactive mode. Thus, the first additional user is coupled at all times with the central voltage source. The first additional user therefore has sufficient energy at any time so that the first additional user can be operated in the normal mode as a result of an awakening by the user.

The communication system further preferably includes a switching terminal, the first additional user being configured to switch the switching terminal to a state, in which a supply input of the user and/or a supply input of a second additional user is supplied with the central supply voltage by the central voltage source. In this way, it is possible to shift such second additional users, which do not have a corresponding function for enabling an awakening of the digital communication system via the communication medium, from a sleep state, for example, a switched-off state, into a normal mode. Similarly, this also enables the communication unit of the user to be switched into an active mode when the communication system is awakened.

Example embodiments of the present invention are described in detail below with reference to the accompanying drawing.

DETAILED DESCRIPTION

The present invention is described below with the aid of a CAN bus system. According to the present invention, however, the digital communication system can also be an arbitrary different communication system, and is not limited to bus systems. Thus, the communication system can also include a network structure. Other exemplary communications systems are a LAN network, for example, an Ethernet network, a FlexRay bus, a LIN network, or a MOST bus. Thus, according to the present invention, so-called Power over Ethernet devices can also be activated.

Figure 1:
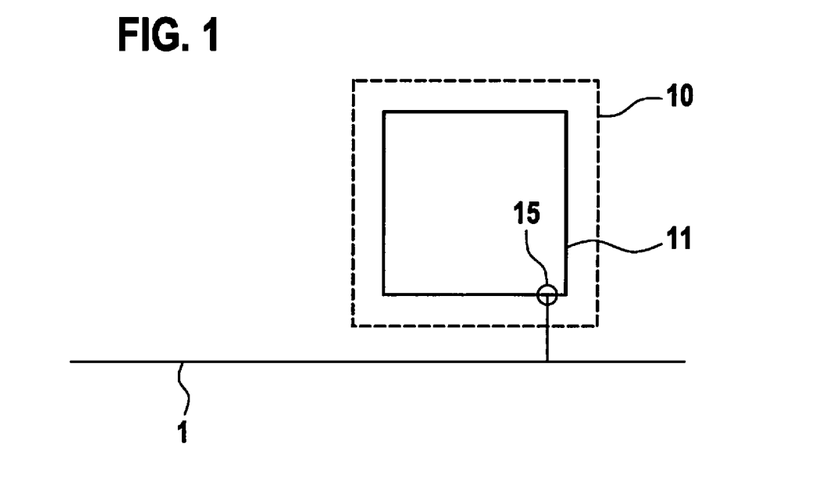
FIG. 1 shows an exemplary user of a communication system according to a first example embodiment of the present invention.

FIG. 1 shows an exemplary user 10 of a communication system 100 according to a first example embodiment of the present invention. Communication system 100 is a CAN bus system. A first logic signal and a second logic signal are transmitted via digital communication system 100. The first logic signal in this example embodiment is a high signal, which is also referred to as a dominant CAN signal. The second logic signal in this embodiment is a low signal, which is also referred to as a recessive CAN signal.

User 10 is a CAN bus user. User 10 encompasses an activation circuit 11. Activation circuit 11 is configured to generate a wake-up signal and includes a supply unit 12, a switching unit 13, a transmission unit 14, and a communication interface 15.

Communication interface 15 is configured to couple activation circuit 11 to a communication line 1 of communication system 100. Communication line 1 in this example embodiment is the bus line of the CAN bus system. If the wake-up signal is generated by activation circuit 11, the wake-up signal is then output on communication line 1 and is thus received by additional users coupled to communication line 1.

Supply unit 12 is configured to provide an internal supply voltage. Switching unit 13 is configured to couple supply unit 12 to transmission unit 14 in order to supply the transmission unit with the internal supply voltage. This takes place in response to an operator request. The operator request in this example embodiment is an actuation of a switch at user 10. If the operator request at user 10 is recognized, supply unit 12 is then coupled to transmission unit 14 and transmission unit 14 is thus supplied by supply unit 12 with the internal supply voltage for an operation of transmission unit 14.

Transmission unit 14 is configured to output the wake-up signal via communication interface 15 in response to the internal supply voltage being supplied by supply unit 12, and thus also in response to the operator request. If transmission unit 14 is not supplied with the internal supply voltage, then the transmission unit outputs no signal to communication interface 15. The wake-up signal in this example embodiment is a logic high signal, which exceeds a predefined period of time $t_{wake}$.

Transmission unit 14 is further configured to continuously output the second logic signal via communication interface 15 following the output of the wake-up signal, until transmission unit 14 is separated from supply unit 12 by switching unit 13. The second logic signal is the LOW signal. Since the LOW signal is the recessive CAN signal, this means that transmission unit 14 continuously outputs no signal via communication interface 15 following the output of the wake-up signal. Transmission unit 14 thus becomes inactive, as a result of which no additional energy of any kind of supply unit 12 is consumed.

Figure 2:
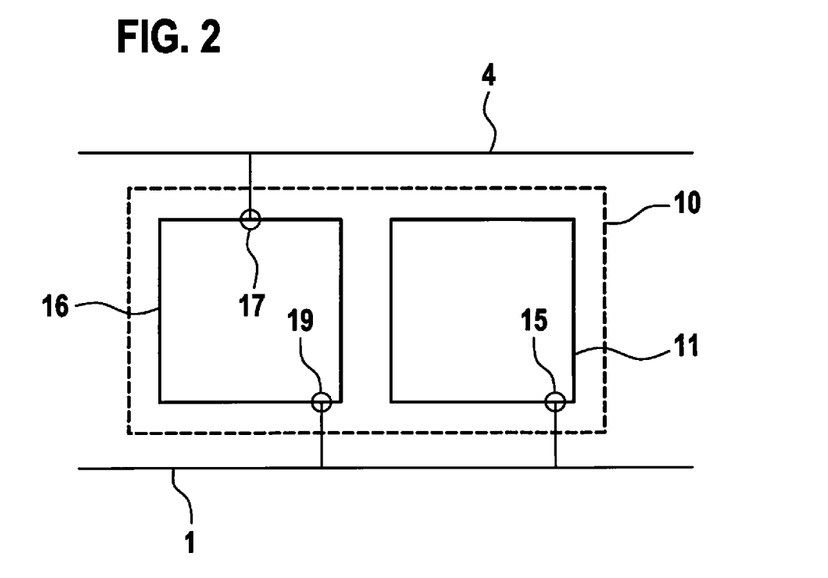
FIG. 2 shows an exemplary user of a communication system according to a second example embodiment of the present invention.

FIG. 2 shows a user 10 according to a second example embodiment of the present invention. Since activation circuit 11 is not suitable for transmitting data other than the wake-up signal, or to even receive data via communication line 1, user 10 according to the second example embodiment includes a communication unit 16, which assumes this function. Communication unit 16 corresponds to a conventional CAN bus user, which is suitable for communicating via a CAN bus.

Communication unit 16 is configured to be coupled to communication system 1. For this purpose, communication unit 16 includes a plug, for example, which is suitable for being coupled to communication line 1. In user 10 shown by way of example in FIG. 2, communication unit 16 and activation circuit 11 are each connected via a communication interface 15, 19 to communication line 1. For this purpose, activation circuit 11 has communication interface 15 and communication unit 16 has an additional communication interface 19. Thus, activation circuit 11 and communication unit 16 each includes, together with respective communication interface 15, 19, an associated driver suitable for the respective type of communication system 100, in this case, a CAN bus system.

Since communication unit 16 is suitable for transmitting data via communication line 1 and for receiving data via communication line 1, the communication unit is configured to transmit and to receive the first logic signal and the second logic signal in communication system 100.

Communication unit 16 includes a supply input 17, and is configured to be supplied with a central supply voltage via supply input 17. For this purpose, a supply line 4 is plugged onto supply input 17, for example. Communication unit 16 is therefore not supplied via supply unit 12.

Figure 3:
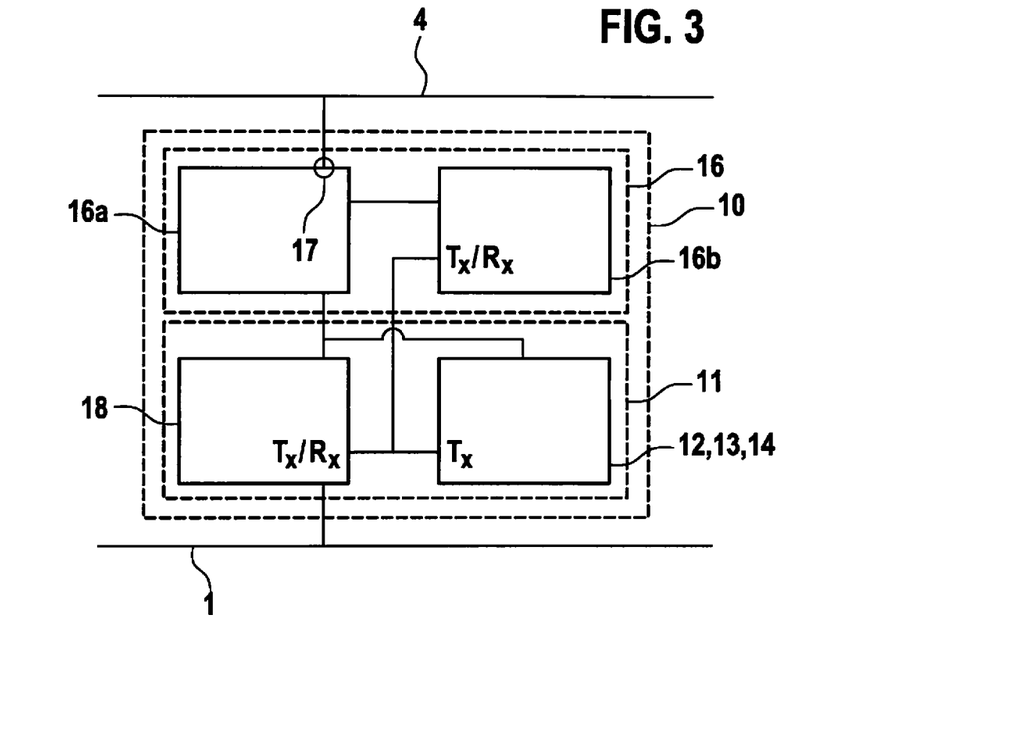
FIG. 3 shows an exemplary user of a communication system according to a third example embodiment of the present invention.

FIG. 3 shows a user 10 according to a third example embodiment of the present invention. This user corresponds essentially to the second example embodiment of the present invention, although activation circuit 11 and communication unit 16 share communication interface 15 of activation circuit 11. In this case, it is immaterial whether communication interface 15 is associated with activation circuit 11 or with communication unit 16, as long as the communication interface is suitable for sending data via communication line 1 and to also receive data via communication line 1.

User 10 in this third example embodiment likewise includes communication unit 16 and activation circuit 11. Supply unit 12, switching unit 13 and transmission unit 14 of activation circuit 11 are depicted in FIGS. 1 and 2 as a shared block.

Communication unit 16 in this case includes a voltage supply 16a and a microcontroller 16b. Voltage supply 16a includes supply input 17 and provides an operating voltage for microcontroller 16b. Microcontroller 16b is suitable for transmitting signals to communication interface 15 and to receive signals from communication interface 15. A corresponding interface of microcontroller 16b is therefore identified by Tx/Rx (transmit/receive) in FIG. 3.

Voltage supply 16a is likewise connected to communication interface 15 in order to supply the communication interface with a requisite operating voltage. However, this takes place only if voltage supply 16a in turn is supplied with voltage via supply line 4.

Furthermore, communication interface 15 is connected to supply unit 12 of activation circuit 11. If voltage supply 16a is not supplied with voltage via supply line 4, for example, because communication system 100 is inactive, then communication interface 15 is supplied with the requisite operating voltage by supply unit 12 of activation circuit 11. This takes place, however, only if the wake-up signal is emitted. Optionally, an energy store of supply unit 12 is charged via voltage supply 16a when voltage supply 16a is supplied with voltage via supply line 4.

Transmission unit 14 outputs the wake-up signal to communication interface 15 in response to a supply of the internal supply voltage by supply unit 12. Since transmission unit 14 subsequently outputs the second logic signal to communication interface 15 until transmission unit 14 is separated from supply unit 12 by switching unit 13, the transmission unit need not be suitable for receiving signals from communication interface 15. A corresponding output of transmission unit 14, which is connected to communication interface 15, is therefore identified by Tx (transmit) in FIG. 3.

Figure 4:
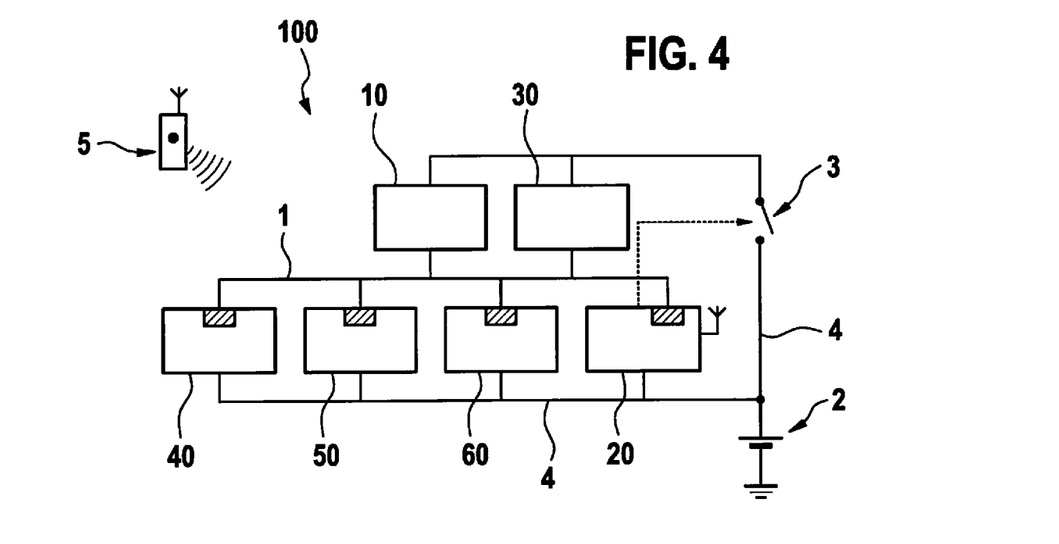
FIG. 4 shows a circuit diagram of an exemplary activation circuit of the exemplary user of a communication system, according to an example embodiment of the present invention.

FIG. 4 shows a circuit diagram of an exemplary activation circuit 11 of user 10 of communication system 100. FIG. 4 in this case shows supply unit 12, switching unit 13, transmission unit 14, and communication interface 15.

Supply unit 12 includes a first resistor R1, a first capacitor C1, a second capacitor C2, a third capacitor C3, and a fourth capacitor C4. First resistor R1 includes a first terminal and a second terminal. Second to fourth capacitors C2, C3, C4 are optional in this case. A first terminal of first through fourth capacitor C1-C4 is connected in each case to the second terminal of first resister R1. A second terminal of first through fourth capacitors C1-C4 is connected in each case to a circuit ground GND. The second terminal of first resistor R1 is further connected to an output A1 of supply unit 12. The first terminal of first resistor R1 is connected to an energy source Q1 of supply unit 12, for example, to a pole of a button cell. Alternatively or in addition, the first terminal of first resistor R1 is connected to a Peltier element and/or to a solar cell. First through fourth capacitor C1-C4 is thus charged via first resistor R1. Thus, a combination of first through fourth capacitors C1-C4 forms an energy buffer, which is charged with the aid of the button cell, of the Peltier element and/or of the solar cell. First through fourth capacitor C1-C4 each has a capacity of 100 μF. First resistor R1 has a resistance value of 5.9 kOhm. If first through fourth capacitor C1-C4 is charged, then the internal supply voltage is present at output A1 of supply unit 12.

Switching circuit 13 includes a first switching contact S1 and a second switching contact S2. First switching contact S1 is connected to an input E1 of switching unit 13. Input E1 of switching unit 13 is coupled to output A1 of supply unit 12. Second switching contact S2 is connected to an output A2 of switching unit 13. First switching contact S1 and second switching contact S2 are connected via one suppressor diode Z1, Z2 each to circuit ground GND in order to dissipate voltage spikes. The two suppressor diodes Z1, Z2 are optional. If first switching contact S1 is electro-conductively connected to second switching contact S2, the internal supply voltage present at input E1 of switching unit 13 is put through at output A2 of switching unit 13. In order to electro-conductively connect first switching contact S1 to second switching contact S2, a switch, for example, is situated between them. This switch can either be directly actuated by an operator if an awakening of communication system 100 is desired or it can be actuated using an additional circuit, for example, a receiver circuit controlled by a remote controlled unit.

Transmission unit 14 includes a voltage input E3. This voltage input E3 is coupled to output A2 of switching unit 13. In this case, a voltage regulator, which allows the internal supply voltage provided by supply unit 12 to be adapted to the requirements of transmission unit 14, is optionally situated between voltage input E3 of transmission unit 14 and output A2 of switching unit 13.

Transmission unit 14 includes a first comparator K1 and a second comparator K2. Transmission unit 14 further includes a second through ninth resistor R1-R9, a fifth through eighth capacitor C5-C8 and a transistor T1. Transmission unit 14 further includes a first diode D1 and a second diode D2. First comparator K1 includes a first input 1IN−, a second input 1IN+, as well as an output 1OUT.

Second comparator K2 likewise includes a first input 2IN−, a second input 2IN+ as well as an output 2OUT.

Second resistor R2 has a resistance value of 147 kOhm. Third and fourth resistor R3 and R4 have a resistance value of 100 kOhm. Fifth and sixth capacitor C5 and C6 have a capacitance value of 10 nF. Fifth and ninth resistor R5 and R9 have a resistance value of 10 kOhm. Sixth and seventh resistor R6 and R7 have a resistance value of 100 kOhm. Seventh and eighth capacitor C7 and C8 have a capacitance value of 1 nF. Eighth resistor R8 has a resistance value of 46.4 kOhm.

A first terminal of second resistor R2 is connected to voltage input E3 of transmission unit 14. A second terminal of second resistor R2 is connected to first input 1IN− of first comparator K1. A first terminal of fifth capacitor C5 is connected to circuit ground GND. A second terminal of fifth capacitor C5 is connected to first input 1IN− of first comparator K1. A first terminal of third resistor R3 is connected to voltage input E3 of transmission unit 14. A second terminal of third resistor R3 is connected to second input 1IN+ of first comparator K1. A first terminal of sixth capacitor C6 is connected to circuit ground GND. A second terminal of sixth capacitor C6 is connected to first input 1IN− of first comparator K1. Sixth capacitor C6 is optional and is suitable for adjusting a lag time, which passes before first comparator K1 switches. A first terminal of fourth resistor R4 is connected to circuit ground GND. A second terminal of fourth resistor R4 is connected to first input 1IN− of first comparator K1.

Output 1OUT of first comparator K1 is connected via fifth resistor R5 to voltage input E3 of transmission unit 14. Output 1OUT of first comparator K1 is connected via seventh capacitor C7 to first input 2IN− of second comparator K2. First input 2IN− of second comparator K2 is connected via sixth resistor R6 and seventh resistor R7, respectively, to circuit ground GND. Furthermore, first input 2IN− of second comparator K2 is connected to a cathode of first diode D1. An anode of first diode D1 is connected to circuit ground GND.

Second input 2IN+ of second comparator K2 is connected via eighth resistor R8 to circuit ground GND. Output 2OUT of second comparator K2 is connected via ninth resistor R9 to voltage input E3 of transmission unit 14. Output 2OUT of second comparator K2 is further connected to a gate contact of transistor T1. Output 2OUT of second comparator K2 is coupled to its second input 2IN+ via eighth capacitor C8. Second input 2IN+ of second comparator K2 is connected to a cathode of second diode D2. An anode of second diode D2 is connected to circuit ground GND. A source contact of transistor T1 is connected to circuit ground GND. A drain contact of transistor T1 is connected to communication interface 15.

Communication interface 15 is encompassed in this example embodiment by transmission unit 14. Communication interface 15 in this example embodiment is a CAN driver. The signal output by first transistor T1 to communication interface 15 does not correspond to the requirements of a signal on the CAN bus, i.e., on communication line 1, since merely one voltage level at the communication interface is pulled by transistor T1 to the voltage level of circuit ground GND. This signal is therefore correspondingly converted by communication interface 15 and adapted to the requirements of the CAN bus.

If the internal supply voltage is applied at voltage input E3 of transmission unit 14 via switching unit 13, then an output signal will change its polarity at output 1OUT of first comparator K1 after a defined period of time has elapsed.

The defined period of time is defined by the selection of the components connected upstream from first comparator K1. As a result, an output signal is subsequently outputted at output 2OUT of second comparator K2, through which first transistor T1 is connected. Since output 2OUT of second comparator K2 is coupled via eighth capacitor C8 to second input 2IN+ thereof, transistor T1 is put through but for only a limited period of time. A pulse sequence is therefore generated. Comparators K1 and K2 are therefore interconnected with the capacitors of transmission unit 14 in such a way that the comparators together form a timer. The first logic signal is subsequently generated in the wake-up signal in accordance with a predefined period of time, which results from the capacitance values of the capacitors used.

Transmission unit 14 shown in FIG. 4 can be subdivided into three segments 14a, 14b, 14c. In a first segment 14a, a time lag is generated once transmission unit 14 is supplied with the supply voltage by supply unit 12. In a second segment 14b, a pulse, also called single shot pulse, is subsequently generated with a predefined temporal duration. This pulse is provided to third segment 14c, which is a transmission control, also called TXD control, and triggers communication interface 15 to output a corresponding signal to communication line 1.

In an alternative example embodiment of the present invention, which corresponds essentially to the first, second, or third example embodiments, transmission unit 14 is configured to output either a first signal pattern or a second signal pattern as a wake-up signal to communication interface 15. For this purpose, first through third segment 14a-14c are each designed in duplicate in a corresponding activation circuit 11, the capacitors in the duplicate first through third segments being selected differently from first through third segments 14a-14c of the first through third example embodiments. In other words, transmission unit 14 includes first and second transmission units. Either the first transmission unit or the second transmission unit is supplied with the supply voltage by supply unit 12 as a function of an operator input. The first transmission unit and second transmission unit generate wake-up signals having different signal patterns. In this way, different users of communication system 20, 30, 40, 50, 60 can be awakened, as a function of which of the transmission units is supplied with supply voltage by supply unit 12.

Figure 5:
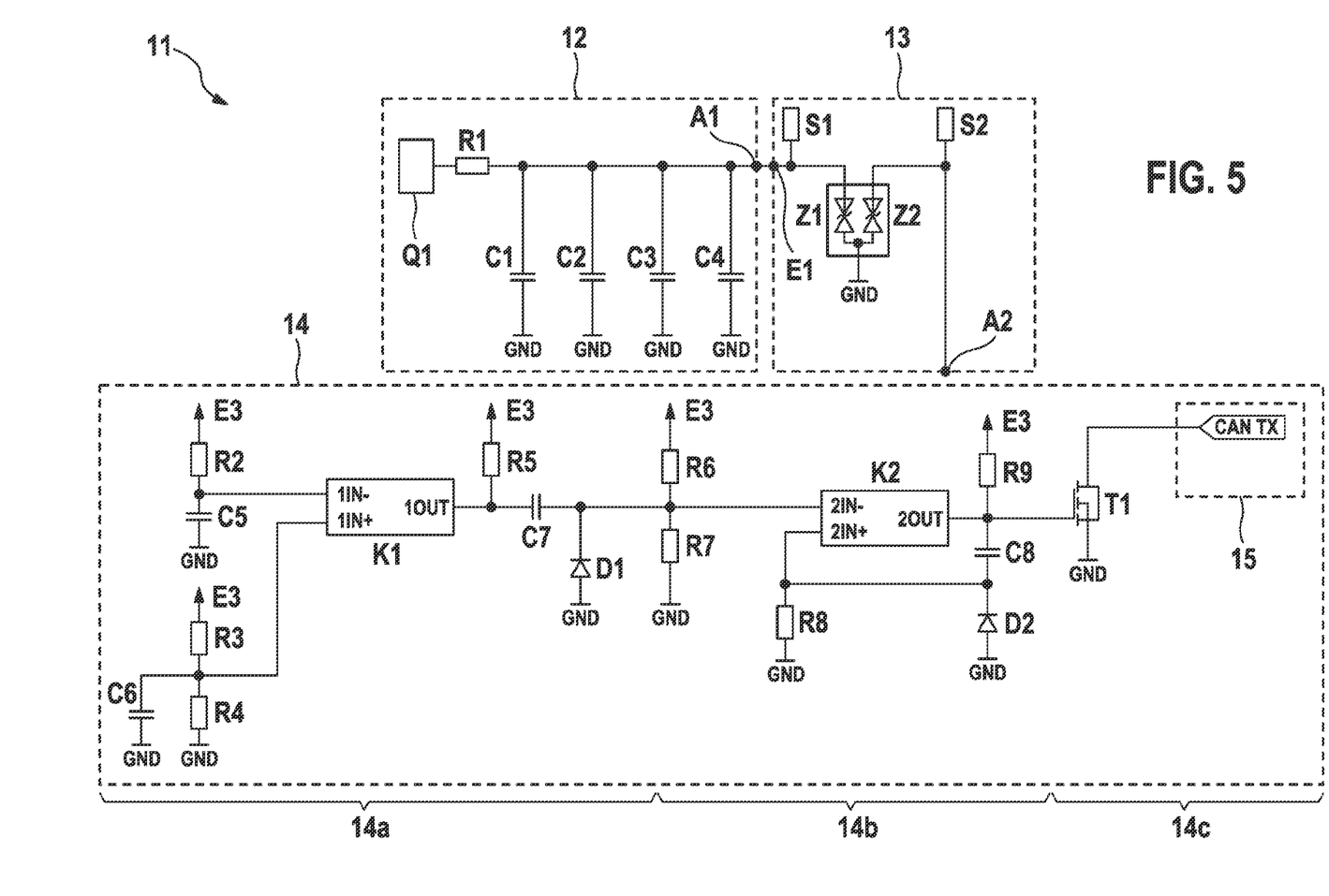
FIG. 5 shows an exemplary communication system according to the present invention according to an example embodiment of the present invention.

FIG. 5 shows an exemplary communication system according to an example embodiment of the present invention. The communication system includes user 10, communication line 1, and a first additional user 20. Communication system 100 further includes a second additional user 30, a third additional user 40, a fourth additional user 50, and a fifth additional user 60. The communication system further includes a central voltage source, which is formed by a battery 2. User 10, as well as first through fifth additional users 20, 30, 40, 50, 60 are connected to one another via communication line 1 of communication system 100. Alternatively, the central voltage source is a power mains network, for example, a 110V or 220V network.

Communication system 100 further includes a supply line 4. First, third, fourth, and fifth additional users 20, 40, 50, 60 are connected to battery 2 via supply line 4 and are continuously supplied by the battery with a central supply voltage. Second additional user 30, as well as user 10, are likewise connected to supply line 4, a switching terminal 3 being situated in supply line 4 between user 10 and battery 2 and, therefore, between second additional user 30 and battery 2, as a result of which user 10 and second additional user 30 can be separated from the central supply voltage.

Supply line 4 is connected to user 10. In this example embodiment, however, only communication unit 16 is supplied with the central voltage supply of battery 2. The energy buffer of supply unit 12 is optionally charged with the aid of the central supply voltage provided by battery 2.

First additional user 20, as well as third, fourth, and fifth additional users 40, 50, 60 are configured to be switched from an inactive mode into an active mode when the respective user receives the wake-up signal via communication line 1. Second additional user 30 does not have this function.

If communication system 100 is in a sleep mode, then switching terminal 3 is in an opened state and first additional user 20, as well as third, fourth, and fifth additional users 40, 50, 60 are in the inactive mode.

If the wake-up signal is then output by user 10 on communication line 1, this wake-up signal is then received by first additional user 20, as well as by third, fourth, and fifth additional users 40, 50, 60, and these additional users switch from the inactive mode into the active mode, these additional users continuing to be supplied by battery 2 with the central supply voltage for their operation.

Second additional user 30 as well as communication unit 16 in user 10 remain initially inactive, since these are separated from the central supply voltage and are not supplied with the central supply voltage needed for operation. First additional user 20 is configured to switch switching terminal 3 into a state in which a supply input 17 of user 10 and a supply input of second additional user 30 is supplied with the central supply voltage by the central voltage source, i.e., by battery 2. This takes place by first additional user 20 closing switching terminal 3. Second additional user 30, as well as communication unit 16 in user 10 are now supplied with the central supply voltage by battery 2 and are therefore switched on, i.e., become active. Thus, all users 10, 20, 30, 40, 50, 60 of communication system 100 are subsequently active and ready for their respective use. Communication system 100 is thus awakened from the sleep mode.

It is noted that even if communication system 100 is awakened from the sleep mode by user 10, i.e., can be shifted into an active state, this does not prevent communication system 100 from also being awakened with the aid of other users, for example, with the aid of first additional user 20. Thus, first additional user 20 in this example embodiment is activatable with a remote control 5. If first additional user 20 is activated with remote control 5, then this additional user transmits the wake-up signal via communication line 1 and closes switching terminal 3. Thus, all users of communication system 100 are likewise subsequently active and ready for their respective use. User 10 is therefore compatible with conventional communication systems.

Figure 6:
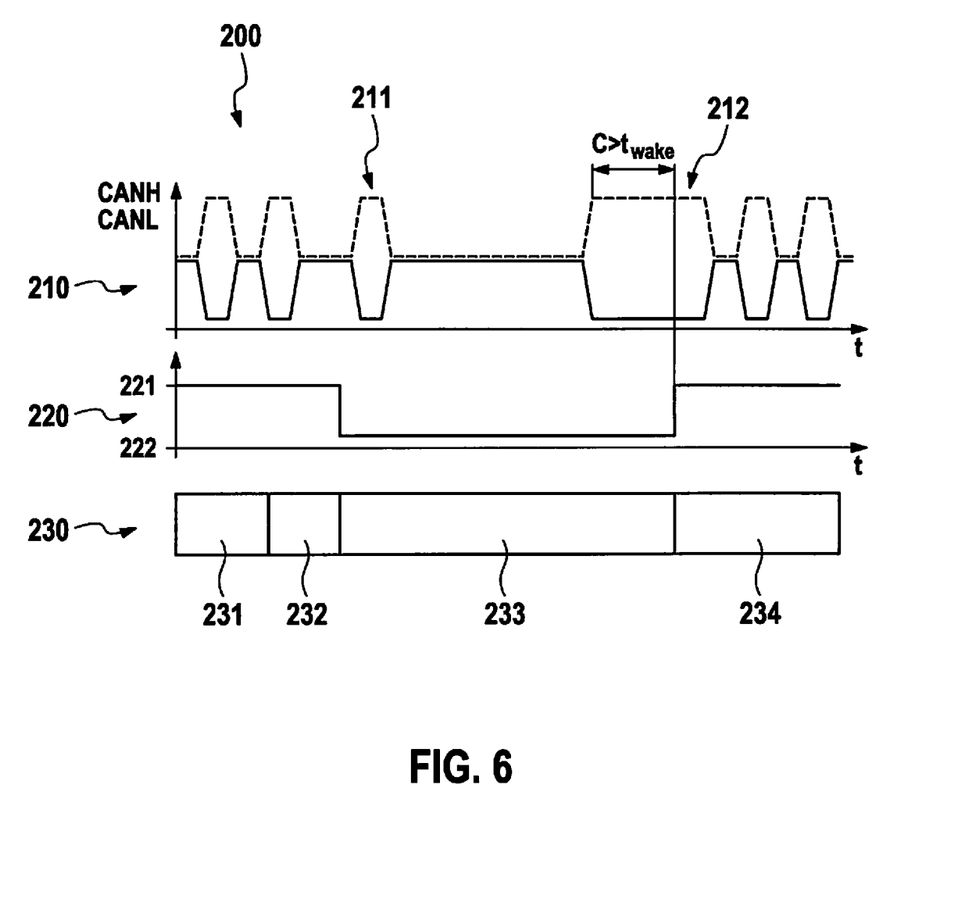
FIG. 6 shows diagrams depicting an exemplary wake-up signal according to an example embodiment of the present invention.

FIG. 6 shows diagrams, which depict an exemplary wake-up signal. A first diagram 210 shows first and second logic signals on a CAN bus. In this case, the first logic signal is present when the CANH signal is different from the CANL signal, i.e., the dominant CAN signal is present. The second logic signal is present when the CANH signal is identical to the CANL signal, i.e., the recessive CAN signal is present. A CANH signal in this case is a voltage level on a first lead of the CAN bus and the CANL signal in this case is a voltage level on a second lead of the CAN bus. A second diagram 220 shows in which time period communication system 100 is in the sleep mode. Thus, an upper state 221 of the graph indicates that communication system 100 is active and a lower state 222 of the graph indicates that communication system 100 is in the sleep mode. A third diagram 230 shows the communication system in different states. The first through third diagrams 210, 220, 230 reflect an identical time period.

In a first time period 231, communication system 100 is in a normal operation. Different signals are transmitted via communication line 1. In a second time period 232, a sleep command is transmitted to all users of communication system 100. Communication system 100 subsequently goes into the sleep mode, in which it is in a third time period 233. If a signal 211 also appears on communication line 1, then communication system 100 remains in the sleep mode if this signal 211 does not correspond to the wake-up signal. If the wake-up signal appears on communication line 1, for example, in the form of a dominant signal 212, which lasts longer than a predefined period of time $t_{wake}$, then communication system 100 switches into the active mode.

In other example embodiments of the present invention, the wake-up signal can, however, have an arbitrary different signal shape; it can, for example, be a signal sequence made up of the first logic signal and the second logic signal.

In the example embodiments described, the wake-up signal exhibit a differential voltage between CANH and CANL, for example, at least 1.15 volts for at least 5 μs, so that the users of communication system 100 interpret this as a wake-up signal. Two button cells connected in series offer an ideal voltage level for commercial 5-volt CAN transceivers. Such a CAN transceiver can be used, for example, as a driver of activation circuit 11. The high current carrying capacity for driving the 60-120 Ohm wave impedance of the CAN bus is buffered by the capacitors of supply unit 12, since button cells offer only a very low maximum current drain with simultaneously high capacitance. The capacitors of supply unit 12 are, in particular, ceramic capacitors, in particular, multilayer ceramic chip capacitors (MLCC). These offer the singular advantage that their serial resistance does not result in a rapid discharge of both button cells. The resilience of the energy supply can be greatly increased by a small solar cell.

According to the present invention, therefore, a wake-up signal, also called wake-up pattern, can be emitted by a maximally reduced energy supply and with a special, but simple circuit, which is sufficient for awakening communication system 100. The activation circuit itself can be identified by pulse sequences from communication system 100. In conjunction with so-called energy harvesting as an energy source of supply unit 12, for example, using a Peltier element or solar cell, which charge the energy buffer with low output for a very long period, and which are able to maintain its charge, it is possible to optimize and maximize the energy supply.

What is claimed is:

1. A user device for a digital communication system, the device comprising:
   an activation circuit that includes:
      a communication interface;
      a supply unit configured to provide an internal supply voltage;
      a switching unit; and
      a transmission unit configured to:
         output, to communication interface and in response to being supplied with the internal supply voltage by the supply unit via a coupling, by the switching unit, of the transmission unit to the supply unit, a wake-up signal that includes a first logic signal; and
         continuously output a second logic signal to the communication interface following the output of the wake-up signal, until the transmission unit is separated from the supply unit by the switching unit.

2. The device of claim 1, further comprising a communication unit that is coupleable to the communication system and is configured to transmit and receive the first logic signal and the second logic signal in the communication system.

3. The device of claim 2, wherein the communication unit includes a supply input by which the communication unit is suppliable with a central supply voltage.

4. The device of claim 1, wherein the transmission unit includes a comparator and a capacitor connected to a timer, by which the transmission unit is configured to generate the first logic signal in accordance with a predefined period of time.

5. The device of claim 1, wherein the supply unit includes a local energy store, in particular, a button cell, a Peltier element and/or a solar cell.

6. The device of claim 5, wherein the local energy store includes a button cell.

7. The device of claim 5, wherein the local energy store includes a Peltier element.

8. The device of claim 5, wherein the local energy store includes a solar cell.

9. The device of claim 1, wherein the supply unit includes a charged energy buffer.

10. The device of claim 9, wherein the energy buffer is charged with a button cell.

11. The device of claim 9, wherein the energy buffer is charged with a Peltier element.

12. The device of claim 9, wherein the energy buffer is charged with a solar cell.

13. The device of claim 1, wherein the transmission unit is configured to output either a first signal pattern or a second signal pattern as the wake-up signal.

14. A communication system comprising:
   a communication line;
   a first user device; and
   a second user device;
   wherein the first user device includes an activation circuit that includes:
      a communication interface;
      a supply unit configured to provide an internal supply voltage;
      a switching unit; and
      a transmission unit configured to:
         output, to communication interface and in response to being supplied with the internal supply voltage by the supply unit via a coupling, by the switching unit, of the transmission unit to the supply unit, a wake-up signal that includes a first logic signal; and
         continuously output a second logic signal to the communication interface following the output of the wake-up signal, until the transmission unit is separated from the supply unit by the switching unit.

15. The communication system of claim 14, wherein the first and second user devices are connected via the communication line, and the second user device is configured to be switched from an inactive mode into an active mode when the second user device receives the wake-up signal via the communication line.

16. The communication system of claim 15, further encompassing a central voltage source configured to provide a central supply voltage, wherein the second user device is coupled to the central voltage source by which the second user device is suppliable with the central supply voltage in the active mode and inactive modes.

17. The communication system of claim 16, further comprising a switching terminal, wherein the second user device is configured to switch the switching terminal into a state in which a supply input of at least one of the first user device and a third user device is supplied with the central supply voltage by the central voltage source.

* * * * *